June 12, 1928.

J. W. MILNOR 1,673,773

CORRECTING EARTH POTENTIALS ON SUBMARINE CABLES

Filed March 27, 1926    2 Sheets-Sheet 1

Inventor
J. W. Milnor
By Eugene C. Brown
Attorney

Patented June 12, 1928.

1,673,773

UNITED STATES PATENT OFFICE.

JOSEPH W. MILNOR, OF NEW YORK, N. Y., ASSIGNOR TO THE WESTERN UNION TELEGRAPH COMPANY, OF NEW YORK, N. Y., A CORPORATION OF NEW YORK.

CORRECTING EARTH POTENTIALS ON SUBMARINE CABLES.

Application filed March 27, 1926. Serial No. 98,047.

My invention relates to telegraph and like signaling systems, and particularly to submarine cable telegraph systems, and provides a method and means whereby automatic correction of what is known as zero displacement, is secured.

More particularly, my invention concerns the utilization of the disturbing earth potentials themselves in order to correct for the detrimental results occasioned by their presence in a cable circuit.

In accordance with the invention, the correction may be made at the receiving end, at the receiving instrument itself, or it may be made at any part of the cable circuit so long as it directly or indirectly counteracts the effects on the coil of the receiving instrument of the disturbing earth potenial. The method does not require an auxiliary control cable or a distant neutral earth.

The particular means used to control the production of a correction current form part of my invention, as well as the system embodying the control means and the novel method utilized in the system.

Other features of the invention will be apparent from the description and the attached drawings.

When earth potentials of a steady or slowly varying character are present in a submarine cable, a current corresponding to the earth potential flows through the coil of the receiving instrument. This results in a variation of the apparent zero position of the coil of the receiving instrument. This variation, especially if the receiving instrument is a cable relay, may be great enough to seriously interfere with the reception of signals. The principle of the system herein described is as follows: the effect of the disturbing earth potential on the coil of the receiving instrument is made to control automatically by suitable apparatus and circuits, the application of a local correction current, or potential, which is equal and opposite in polarity to the current induced by the earth potential. In the several embodiments of my invention illustrated in the attached drawings, the local correction current is shown to be applied directly to the coil of the receiving instrument, but in its broad aspect my invention comprehends the application of the correcting current to any part of the cable circuit.

The control of the correcting current and also its application to the receiving apparatus may each be accomplished in several ways which are described in the following: the various arrangements are illustrated more or less diagrammatically in the drawings in which.

Figure 1:
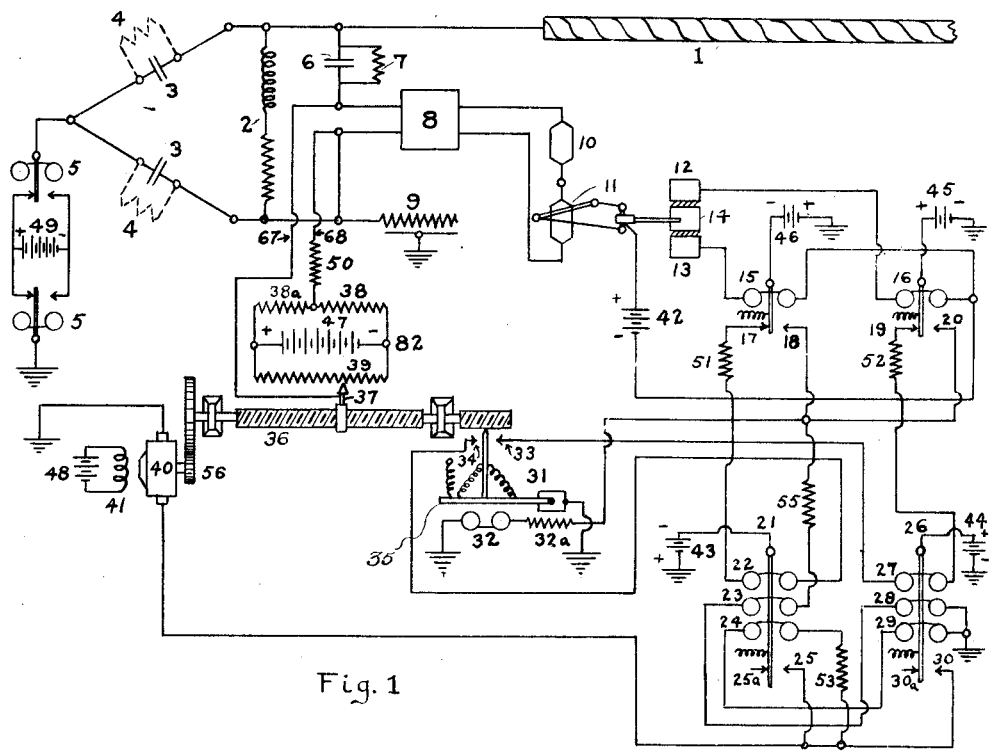
Fig. 1 is a diagrammatic representation of a system of correction embodying the principle above set forth.

On the drawings like reference characters are used in the several figures to designate similar parts. The cable 1 on which the disturbing earth potential is present is connected to any usual form of receiving instrument, the usual magnetic shunt being shown at 2. The receiving condenser 6 and resistance 7 shunting it, are the usual signal shaping elements of the cable circuit. A cable amplifier of any of the well known types is diagrammatically indicated at 8, to which is connected the coil 10 of the receiving instrument which may be a siphon recorder or any type of cable relay. In order to make possible duplex working, an artificial cable 9 may be used in the manner well known in the art.

Referring especially to Fig. 1, which shows the invention applied to a duplex circuit—3, 3, represent the block condensers generally used in a bridge duplex circuit, and 4, 4 are resistances shunting the block condensers which may or may not be used in applying this system of correction to the cable circuit. The transmitting relays 5, 5 are connected to the sending battery 49.

The apparatus shown diagrammatically in Fig. 1, involved in the correcting system will now be described. This correcting apparatus includes a cable relay 11 of any of the well known types in which 14 designates the zero position, or "no-man's land", and 12 and 13 the contacts. Relay 11 responds both to signal impulses and to currents from earth potentials. However, the "no-man's-land" is wide enough so that when the earth potentials are not present or are correctly neutralized the relay will not make contact on either 12 or 13, even though signal impulses are being received. If, on the other hand, an unneutralized extraneous current is present, causing the zero position of the relay to be disturbed, the relay will make contact, when signals are being sent, on 12 or 13 depending upon the polarity of the earth potential. Relay 11 is arranged to control, through an intermediate circuit, the operation of the motor 40, of which the field 41 is excited by the battery 48. When relay 11 makes contact, the motor 40 starts operating in the proper direction. The motor, in turn, through the gears 56, causes the worm gear 36 to rotate, this causing the contact slider 37 of rheostat 39 to move to right or left depending on the direction of rotation of the motor.

The rheostat 39 forms the two variable arms of a Wheatstone bridge arrangement, with the equal resistances 38 and 38$^a$ forming the other arms. Battery 47 is connected across one diagonal of the bridge, while the other diagonal of the bridge is connected through the high resistance 50, across the terminals of the amplifier 8. The intermediate relay circuit, between relay 11 and the motor 40, comprising relays 15, 16, 21, 26 and 31, is arranged to be slow acting so that whenever the contact of relay 11 closes for an instant, the motor will be kept in operation for a definite length of time, say one second. The armatures of relays 15, 16, 21 and 26 are normally held on contacts 17, 19, 25$^a$ and 30$^a$ respectively; this may be done either by mechanical or electrical means. The lever of armature 35 of relay 31 is normally held in a position midway between the contacts 33 and 34, and engaged in the worm gear 36.

The action resulting with the circuit arrangement described is as follows:

With no disturbing earth potential present in the cable and hence no extraneous current in the coil of relay 11, the contact lever of relay 11, though responding to signal impulses, moves only in the "no-man's-land" 14, and does not make contact on either side 12 or 13. Thus the armatures of the relays in the intermediate circuit all retain their normal positions, the motor does not operate, and the Wheatstone bridge, being in a balanced condition, supplies no correction current to the amplifier 8. If now an earth potential builds up in the cable which results in an extraneous current in the coil of relay 11 then the apparent zero position of the contact lever is moved to one side or the other depending on the polarity of the earth potential. If the polarity is such as to cause the apparent zero position to be moved toward contact 13, then when the relay coil is acted on by signals of the same polarity as the earth potential, the contact lever will make contact with 13 for each signal impulse of that polarity. This action closes the circuit through the coil of relay 15 in series with the battery 42 causing the armature of relay 15 to move to the right and close contact 18. This in turn completes the circuit through resistance 55, coil 23 of relay 21, coil 28 of relay 26, and the battery 46, causing a current to flow through coil 23 of relay 21 in a direction which, in accordance with convention, is assumed to be from left to right, thus moving the armature to contact 25. It also causes a current to flow through coil 28 of relay 26 from right to left, thus holding the armature on contact 30$^a$. In addition when the contact at 18 is closed, a circuit is established through coil 32 of relay 31 and the battery 46, causing a current to flow in said coil, thus attracting the armature of this relay, and disengaging it from the worm gear. When the contact at 25 is closed, a circuit is established causing a current to flow from the battery 43 through coil 29 of relay 26 from right to left, through coil 24 of relay 21 from left to right, and through the control resistance 53. This action causes the armatures of relays 21 and 26 to be locked or held in the position assumed when the contact at 18 was closed. Even though the tongue of relay 11 moves off the contact 13, thus causing the contact at 18 to break, the armatures of relays 21 and 26 are locked so as to make contact at 25 and 30$^a$ and are thus held until a later time in a way to be described subsequently. When the armature of relay 21 makes contact at 25, an additional circuit is closed causing a current to flow from the battery 43 through the armature of motor 40 and back to the battery 43. This causes the motor to operate slowly, rotating the worm gear, and moving the contact slider 37 on the rheostat, say to the left, thus unbalancing the bridge and causing a current to flow through the connecting wire 67, the input circuit of amplifier 8, and back through the wire 68 and the high resistance 50 to the bridge circuit. This current is of such polarity that it tends to neutralize the disturbing current, and the motor will continue to operate until the bridge is unbalanced enough to supply a correcting current of such value and polarity as to exactly neutralize the extraneous current.

As stated before, even though the contact lever of relay 11 breaks contact at 13 between signal impulses, the motor still continues to operate for a short time due to the locking arrangement on relays 21 and 26. The length of time during which the motor will operate after the contact at 13 is broken, is controlled by relay 31 in the following manner. When the contact at 13 is broken, the armature of relay 15 moves back to its normal position making contact with 17. This breaks the circuit through battery 46, contact 18, resistance 32ª, and coil 32 of relay 31, thus releasing the armature 35. The armature lever which is pivoted on the armature, then engages in the worm gear and is carried to the left until it touches contact 34. This action establishes a circuit and causes a current to flow from battery 46 through contact 34 and relay armature 35, through coil 22 of relay 21 from right to left, resistance 51, contact 17, and armature of relay 15 back to battery 46. It will be remembered that the locking current in coil 24 of relay 21 flowed from left to right. The action then of the relay coil 22 tends to neutralize the effect of coil 24, and, as the current in coil 22 is arranged to be greater than that in coil 24, the armature of relay 21 will move to the left, thus breaking the contact 25 and stopping the motor. The proper length of time for the travel of the lever of armature 35 of relay 31 from its zero position to the contact 34 depends, of course, on conditions under which this system is applied. An approximate time would be about one second. Then assuming that the signal impulses causing the contact at 13 to close, occur at least once per second, the motor will continue to operate until the correction current is of such value that signal impulses no longer cause relay 11 to close contact at 13; or, in other words, until the correction current has exactly neutralized the disturbing current.

The action of the system when an earth potential causes the relay 11 to make contact at 12 may be traced in similar manner. It is sufficient to say that under this condition the motor is caused to rotate in a direction opposite to that obtained in the first case, thus moving the contact slider 37 to the right and unbalancing the bridge so that a correction current of the proper direction is impressed on the input of amplifier 8.

Figure 2:
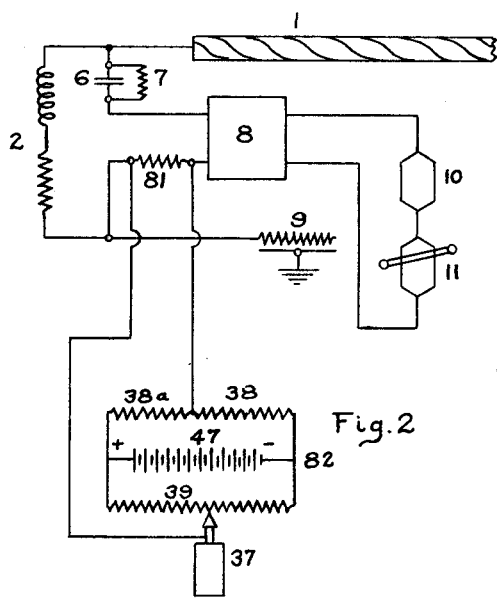
Figs. 2 and 3 are fragmentary diagrams illustrating alternate means of applying the correcting current to the receiving apparatus.

In Fig. 2, illustrating an alternate method of applying the correction current to the receiving circuit, the output of the correction circuit is connected in series with the receiving circuit and is shunted by a low resistance 81. The resistance 81 is low enough in value so that the strength of the received signaling current is not materially affected.

Figure 3:
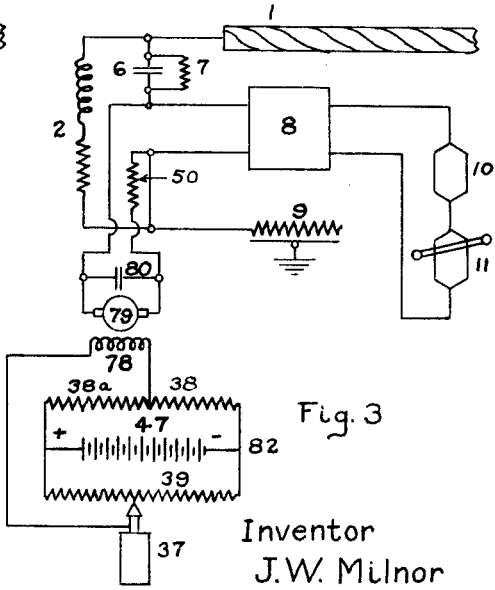

In a third method of applying the correction current, illustrated in Fig. 3, the motor-driven rheostat 39 controls the excitation of the field 78 and hence the output voltage and current of the generator 79. The generator 79, then, applies the correction current to the receiving system. A large condenser 80 is connected in shunt across the generator armature to remove commutator ripples.

Figure 4:
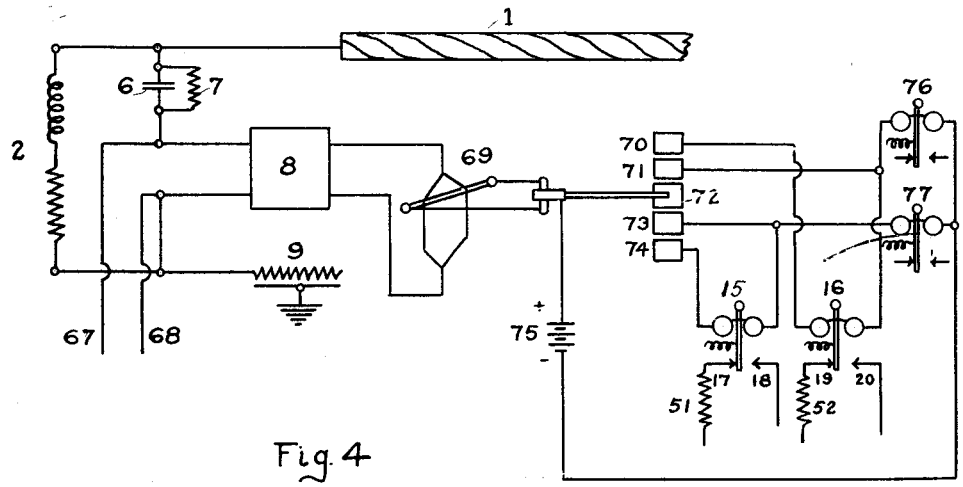
Figs. 4 and 5 are fragmentary diagrams illustrating alternate means of controlling the correcting current.

An alternate method of controlling the correction current shown in Fig. 4, makes use of a cable relay 69, which, in addition to the regular contacts 71 and 73 and the "no-man's-land" 72, is provided with two extra contacts 70 and 74. 76 and 77 are "sending on" relays used for transmitting into another section of cable, or for operation of local recording apparatus. Relays 15 and 16 correspond to relays 15 and 16 of Fig. 1.

The operation of the circuit of Fig. 4 is as follows: When relay 69 is acted on by signalling currents, with no earth currents present, the relay contact lever in response to the signal impulse moves to contact 71 or 73, but it is not deflected far enough to make contact with 70 or 74. Thus when the contact lever makes contact at 71 or 73 the "sending on" relay 76 or 77 is caused to operate, but the relays 15 and 16 are not affected. If, however, an earth potential builds up, the resulting current of which causes the contact lever of relay 69 to be deflected, say, toward 73, then under influence of signal impulses of the same polarity as the earth potential, the lever will make contact at 74. With the contact at 74 closed, the armature of relay 15 is carried to contact 18, and "sending-on" relay 77 is cause to operate in the usual way. The operation of the correction system from this point is the same as that illustrated in Fig. 1, and described previously. Thus the "sending-on" relay 77 operates when contact is made either at 73 or at 74, but control relay 15 operates only when contact is made at 74.

Obviously, if the earth potential is of the opposite polarity, signal impulses of this opposite polarity cause deflection of the contact lever of relay 69 toward contact 70, and with the closing of contact 70 there follows operation of "sending-on" relay 76 and of relay 16.

Figure 5:
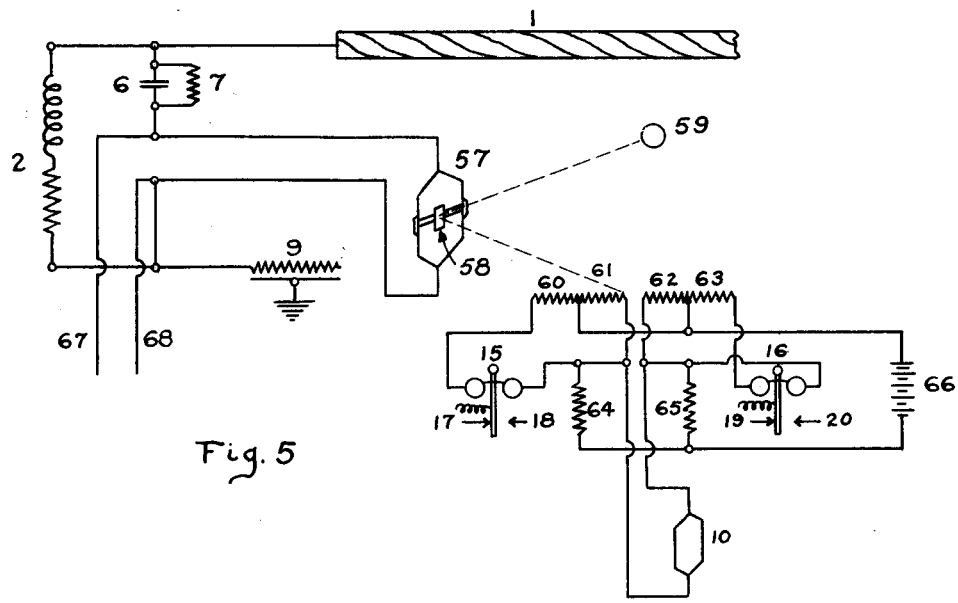

Fig. 5 illustrates a third method of control of the correction current. In this figure 57 designates the coil of a magnifier of the radiant beam type, such as a selenium cell magnifier; 58 a small mirror attached to the coil; 59 a source of light and an optical system for concentrating a light beam on the mirror; 61 and 62 are photo-electric or light sensitive cells such as the selenium cells of the ordinary selenium magnifier; 60 and 63 are auxiliary selenium cells, similar to 61 and 62, and used in the control of the correction current. Resistances 64 and 65 form two arms of a Wheatstone bridge arrangement. A third arm of the bridge is formed by selenium cell 61 shunted by selenium cell 60 and the coil of relay 15 connected in series, and the fourth arm is formed by selenium cell 62 shunted by selenium cell 63 and the coil of relay 16 connected in series. Relays 15 and 16 correspond to relays 15 and 16 in Fig. 1. Across one diagonal of the bridge is connected the battery 66 and across the other, the coil of the siphon recorder or cable relay is connected.

The operation of the circuit of Fig. 5 may be described as follows: When the coil 57 is in its zero position the light beam is centered so that the selenium cells 61 and 62 are each partially and equally illuminated and the bridge arrangement is balanced so that no current flows through the coil 10. When coil 57 is acted on by signal impulses, the light beam is deflected to the right or left depending on the polarity of the signaling current. When the light beam is deflected to the left, more of selenium cell 61 and less of selenium cell 62 is illuminated, thus decreasing the electrical resistance of 61 and increasing that of 62 to unbalance the bridge and cause a current to flow in coil 10; when the light beam is deflected to the right, the bridge is unbalanced so that the current in coil 10 is opposite in polarity to that of the first case. Under the influence of signal impulses only, the light beam never moves beyond the selenium cell 61 on the one side, or cell 62 on the other side, and the action is the same as is obtained with the ordinary selenium magnifier. However, if an earth current is present so that the apparent zero position is moved to one side of its true zero position, say toward cell 60, then, under the influence of signal impulses of the same polarity, the light beam will be deflected so as to illuminate partially or completely the cell 60. The action of the light beam on cell 60 is to lower its electrical resistance, causing an increased current to flow in the circuit formed by cell 60, coil of relay 15, resistance 64 and battery 66. While the normal current in the coil of relay 15 is insufficient to cause the relay to operate, the increased current obtained by the above described action will operate the relay, which controls the correction current as explained in connection with Fig. 1. Likewise relay 16 is operated when the light beam is deflected so as to illuminate cell 63. The main duty of the amplifier is fulfilled also at the same time, for even if the light beam does pass from cell 61 to cell 62 the bridge circuit is still unbalanced to a degree corresponding to the deflection of the light beam from its apparent zero position, resulting in a correspondingly magnified current in coil 10.

It is, of course, obvious that any one of the three methods of correction current control, illustrated in Figs. 1, 4 and 5, may be used in conjunction with any one of the three methods of applying the correction current which are illustrated in Figs. 1, 2 and 3.

When the correction current is applied as illustrated in Figs. 1 and 3, the resistance 50 is of a value high enough so that very little of the received signaling current is shunted around the receiving apparatus.

In so far as the operation of this correction system is concerned, the amplifier 8 illustrated in Figs. 1, 2, 3 and 4 may be omitted, the receiving coil 10 and relay 11 (or receiving relay 69) being connected directly to the cable circuit.

It is to be noted that though the correcting apparatus does not operate in response to signal impulses alone, it is nevertheless under the control of signal impulses of the same polarity as the unneutralized earth potential to the extent that it operates, due to the combined action of signal impulses and a biasing voltage.

The apparatus and methods have been illustrated with particular reference to cable circuits with the usual arrangement of duplex connections. It will be obvious that the invention is equally applicable with other arrangements of the cable operating apparatus, and may be used equally efficiently with a cable operated simplex, i. e. in one direction only.

What I claim is:

1. In a cable system, the method of correcting for zero displacement which consists in generating a correcting current and controlling said correcting current by the combined action of a signal impulse and a biasing earth potential.

2. The method of eliminating the effect of earth potentials in a cable system which consists in producing by the combined action of a signal impulse and the earth potential a correcting potential equal to the earth potential, and neutralizing the earth potential by the correcting potential.

3. In a cable system comprising receiving apparatus which includes a member oscillatable about a zero position, the method of maintaining the zero position unaffected by disturbing potentials impressed across the receiving apparatus which consists in generating under control of signal impulses a correcting potential equal to the disturbing potential across the receiving apparatus, and opposing it to the disturbing potential.

4. In a cable system comprising receiving apparatus which includes a member oscillatable about a zero position, the method of maintaining the zero position unaffected by disturbing potentials impressed across the receiving apparatus which consists in generating at the receiving end by the combined action of a signal impulse and the disturbing potential a correcting potential equal and opposite to the disturbing potential.

5. The method of preventing distortion of received signal impulses by biasing earth potentials which consists in generating, subject to the receipt of a signal impulse of the same polarity as the disturbing potential, a neutralizing potential equal to the biasing potential.

6. The method of preventing distortion of received signal impulses by biasing earth potentials, which consists in generating, subject to the simultaneous receipt of the disturbing potential and a signal impulse, a neutralizing potential equal to the biasing potential.

7. In a signal receiving system, a receiving instrument, a potentiometer connected thereto, and means operating automatically in response to a disturbing voltage to apply a voltage from the potentiometer to the receiving instrument.

8. In a signal receiving system, a receiving instrument, a potentiometer connected thereto, and means operating automatically in response to a disturbing voltage to vary the voltage applied from the potentiometer to the receiving instrument.

9. In a signal receiving system, a potentiometer, a receiving instrument, means to apply a voltage from the potentiometer to the receiving instrument in automatic response to a disturbing earth potential, and means to continuously vary the voltage until it attains a value equal and opposite to the disturbing potential.

10. In a signaling system subject to disturbing earth potentials, a receiving instrument, a source of neutralizing voltage connected thereto, a correction relay under control of the receiving instrument intermittently energized in synchronism with signal impulses of one polarity, and means under control of the correction relay for varying continuously the voltage supplied from said source.

11. In a signal receiving system subject to distorting earth potentials, a receiving instrument including a movable member, a potentiometer connected to the receiving instrument, means under control of the movable member for controlling the potential supplied from the potentiometer to the receiving instrument.

12. In a signaling system subject to disturbing earth potentials, a receiving instrument, a Wheatstone bridge arrangement connected to the receiving instrument through one diagonal, for supplying a neutralizing potential thereto, correcting apparatus for unbalancing the bridge in one direction, correcting apparatus for unbalancing the bridge in the other direction, and means for operating the one or the other apparatus in selective response to disturbing potentials of different polarities.

13. In a signaling system subject to disturbing earth potentials, a receiving instrument, a Wheatstone bridge arrangement connected to the receiving instrument through one diagonal for supplying a neutralizing potential thereto, means for unbalancing the bridge in either direction and means for selectively operating the unbalancing means by signal impulses of the same polarity as the disturbing potential.

14. In a cable system, receiving apparatus adapted to compensate for disturbing earth potentials comprising a signal receiving circuit, means responsive to signal impulses to control said circuit, a correction circuit and means under control of the signal impulses but nonresponsive to the signal impulses alone for controlling the correction circuit.

15. In a system subject to disturbing earth potentials, a source of neutralizing potential therefor comprising a battery, a pair of fixed resistances connected across the battery, an output circuit connected to the midpoint of one resistance and to a variable contact on the other resistance, means for moving the contact, and means for automatically controlling the direction and amount of said motion in response to the polarity and amount of the disturbing potential.

16. In a system subject to disturbing earth potentials, means for supplying a neutralizing potential comprising a balanced bridge arrangement including a variable contact adapted to unbalance the bridge in either direction, a motor for varying the contact, a system of relays for driving the motor in either direction depending on the polarity of the disturbing potential, said system including a pair of correction relays and a pair of intermediate relays, means to energize a correction relay and a corresponding intermediate relay upon the receipt of a disturbing potential of either polarity and a signal impulse, a control circuit for the motor under control of the intermediate relay, a locking winding for each intermediate relay and means to open the locking circuit after a predetermined lapse of time.

17. In a system subject to disturbing earth potentials, a receiving instrument including a movable member, a correction relay the circuit of which is controlled by movement of the member in response to a disturbing potential and a signal impulse of the same polarity, an intermediate relay having energizing, locking and deenergizing windings, a restoring relay provided with a delayed contact means, a circuit through said energizing winding and a circuit through said restoring relay under control of alternate contacts of the correction relay, a locking circuit through said locking winding closed upon energization of the intermediate relay, a motor, a circuit for the motor under control of the intermediate relay, a circuit through the deenergizing winding under control of the delayed contact means, a source of neutralizing potential and means for causing operation of the motor to cause variation of the potential from said source.

18. In a signaling system subject to disturbing earth potentials, a receiving instrument, means for supplying a neutralizing potential thereto comprising a potentiometer with a variable contact, a worm gear provided with a rider, the potentiometer contact being carried by the rider, a motor for driving the worm gear, and circuit control means for said motor including a pair of contacts one of which is mounted on a carrier engageable in the worm gear.

In testimony whereof I affix my signature.

JOSEPH W. MILNOR.